United States Patent
Xu et al.

(10) Patent No.: US 12,149,378 B2
(45) Date of Patent: Nov. 19, 2024

(54) DATA COMMUNICATION METHOD AND DEVICE

(71) Applicant: Beijing Co Wheels Technology Co., Ltd, Beijing (CN)

(72) Inventors: Yingchun Xu, Beijing (CN); Shaolin Wang, Beijing (CN); Ertao Zhao, Beijing (CN)

(73) Assignee: Beijing Co Wheels Technology Co., Ltd, Beijing (CN)

( * ) Notice: Subject to any disclaimer, the term of this patent is extended or adjusted under 35 U.S.C. 154(b) by 4 days.

(21) Appl. No.: 18/366,356

(22) Filed: Aug. 7, 2023

(65) Prior Publication Data

US 2023/0388148 A1 Nov. 30, 2023

Related U.S. Application Data

(63) Continuation of application No. PCT/CN2021/128259, filed on Nov. 2, 2021.

(30) Foreign Application Priority Data

Feb. 10, 2021 (CN) .......................... 202110181733.X

(51) Int. Cl.
*H04L 67/55* (2022.01)
*H04L 12/40* (2006.01)

(52) U.S. Cl.
CPC ........ *H04L 12/40006* (2013.01); *H04L 67/55* (2022.05)

(58) Field of Classification Search
CPC .......................... H04L 12/40006; H04L 67/55
See application file for complete search history.

(56) References Cited

U.S. PATENT DOCUMENTS

| 2016/0269225 A1 | 9/2016 | Kirchmeier et al. |
| 2020/0068371 A1 | 2/2020 | Lowe |
| 2023/0076669 A1* | 3/2023 | Acharya ................. H04W 4/44 |

FOREIGN PATENT DOCUMENTS

| CN | 109278674 A | 1/2019 |
| CN | 110166557 A | 8/2019 |

(Continued)

OTHER PUBLICATIONS

ISR for PCT application PCT/CN2021/128259.
(Continued)

*Primary Examiner* — Suraj M Joshi
(74) *Attorney, Agent, or Firm* — Maginot, Moore & Beck, LLP

(57) ABSTRACT

A data communication method includes: acquiring a data subscription list for defining a data transmission relationship between each first device and each second device in the vehicle; establishing, according to the data subscription list, an association between a transmission protocol of a first device and a transmission protocol of a second device having a data transmission relationship with the first device to generate a data distribution list for defining a data transmission requirement between the first device and the second device having the data transmission relationship with the first device; and when data transmitted from at least one first device is received, transmitting data of each of the at least one first device to a second device having a data transmission relationship with the respective first device according to a corresponding data transmission requirement of the data distribution list.

18 Claims, 3 Drawing Sheets acquiring a data subscription list, wherein the data subscription list is configured to define a data transmission relationship between each first device and each second device in the vehicle — 101 establishing, according to the data subscription list, an association between a transmission protocol of a first device and a transmission protocol of a second device having a data transmission relationship with the first device to generate a data distribution list, wherein the data distribution list is configured to define a data transmission requirement between the first device and the second device having the data transmission relationship with the first device — 102 when data transmitted from at least one first device is received, transmitting data of each of the at least one first device to a second device having a data transmission relationship with the respective first device according to a corresponding data transmission requirement of the data distribution list — 103

(56) References Cited

FOREIGN PATENT DOCUMENTS

| CN | 110213241 | A |   | 9/2019  |
|----|-----------|---|---|---------|
| CN | 110460621 | A |   | 11/2019 |
| CN | 111665738 | A |   | 9/2020  |
| CN | 111835627 | A |   | 10/2020 |
| CN | 112272132 | A | * | 1/2021  |
| CN | 112953802 | A |   | 6/2021  |

OTHER PUBLICATIONS

English translation of ISR for PCT application PCT/CN2021/128259.
EE Communication Network Design and Research Based on SOME/IP Yangchun Li et al., Automotive Digest No. 08, Jul. 29, 2019.
Application of TRDP protocol in train control management system Yanli Chen et al.; Telecom World, No. 23.
Application of TRDP protocol in train control management system—English translation.
Real Time Distributed Communication on Ships Based on DDS Hou, Yu et al., Ship Electronic Engineering No. 09.
OA for CN application 202110181733.X.
English translation of OA for CN application 202110181733.X.
Notice of Allowance for CN application 202110181733.X.
English translation of Notice of Allowance for CN application 202110181733.X.

* cited by examiner

DATA COMMUNICATION METHOD AND DEVICE

CROSS-REFERENCE TO RELATED APPLICATION

This application is a continuation of International Application No. PCT/CN2021/128259, filed with the China National Intellectual Property Administration on Nov. 2, 2021, claims priority to and benefits of Chinese Patent Application Serial No. 202110181733.X, filed with the China National Intellectual Property Administration on Feb. 10, 2021, the entire content of which is incorporated herein by reference.

FIELD

The present disclosure relates to a field of data communications, and more particularly to a data communication method and device.

BACKGROUND

With the development of technologies, more and more vehicle functions can be realized by software, which may be integrally deployed in the in-vehicle central computing platform, and the functions can be realized by the in-vehicle central computing platform through various calculations. In order to realize the software functions, the in-vehicle central computing platform requires data transmitted from each in-vehicle terminal through the in-vehicle communication bus. However, the protocol involved in the in-vehicle communication bus is different from the protocol of Ethernet which the in-vehicle central computing platform is connected to, and thus conversion is required during data transmission.

At present, data conversion between the in-vehicle communication bus and Ethernet needs to be done by a separate processing chip such as a microcontroller unit (MCU) or a system on chip (SOC), and a switch chip. A delay caused by the conversion is usually ranging from a few milliseconds to hundreds of milliseconds, which cannot meet the real-time requirements of vehicle control and automatic driving functions. In addition, data conversion needs to be carried out one by one, and a large amount of data cannot be transmitted to the in-vehicle central computing platform simultaneously, resulting in a large delay in data communication, and thus a safety risk for the vehicle.

SUMMARY

In embodiments of a first aspect of the present disclosure, a data communication method is provided and applied to a field programmable gate array chip deployed in a vehicle. The data communication method includes: acquiring a data subscription list, wherein the data subscription list is configured to define a data transmission relationship between each first device and each second device in the vehicle; establishing, according to the data subscription list, an association between a transmission protocol of a first device and a transmission protocol of a second device having a data transmission relationship with the first device to generate a data distribution list, wherein the data distribution list is configured to define a data transmission requirement between the first device and the second device having the data transmission relationship with the first device; and when data transmitted from at least one first device is received, transmitting data of each of the at least one first device to a second device having a data transmission relationship with the respective first device according to a corresponding data transmission requirement of the data distribution list.

In embodiments of a second aspect of the present disclosure, a vehicle communication system is provided. The system includes a communicator configured to perform the data transmission method as described in the first aspect when it is operated.

In embodiments of a third aspect of the present disclosure, a vehicle is provided. The vehicle includes: a field programmable gate array chip, a vehicle communication system including a communicator configured to perform the data transmission method as described in the first aspect when it is operated, at least one first device and at least one second device. Each first device is configured to transmit data to the field programmable gate array chip. The field programmable gate array chip is configured to transmit the data of the first device to a second device having a data transmission relationship with the first device under control of the vehicle communication system. Each second device is configured to receive data transmitted by the field programmable gate array chip.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, which shall not be construed to limit the present disclosure. In the drawings, same elements are denoted by the same reference numeral.

DETAILED DESCRIPTION

Figure 1:
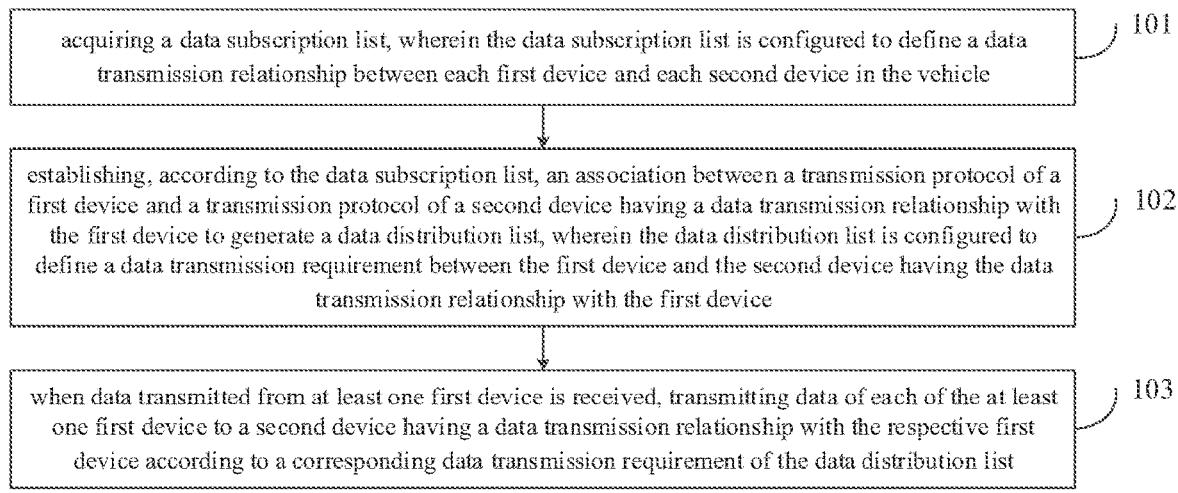
FIG. 1 is a flow chart of a data communication method according to an embodiment of the present disclosure.

Embodiments of the present disclosure are described in detail with reference to the drawings. It should be noted that the embodiments described herein with reference to drawings are explanatory, and used to generally understand the present disclosure. The embodiments shall not be construed to limit the present disclosure. Rather, these embodiments are provided to make the present disclosure more readily appreciated, and apparent to those skilled in the art.

In practical applications, the data communication method is applied to a field programmable gate array chip deployed in a vehicle. The field programmable gate array chip is a component connected to an in-vehicle communication bus and a gateway of Ethernet. Further, the field programmable gate array chip is connected with each first device of the vehicle through an in-vehicle communication bus, and is connected with each second device in the vehicle through Ethernet. The field programmable gate array chip is used to realize the communication between the first device and the second device, such that the second device may perform calculations to the data provided by the vehicle terminal(s) to provide a data basis for the automatic driving of the vehicle or the normal operation of the vehicle.

A protocol involved in the data transmission from the first device through the in-vehicle communication bus is different from a protocol involved in the data transmission from the second device through Ethernet to a certain extent. In order to realize that the data of the first device can be used by the second device, the field programmable gate array chip is used to realize the data communication between the first device and the second device, to make the data transmitted to the second device operational by the second device.

The specific type of the field programmable gate array chip is not specifically limited in the embodiments. Alternatively, the field programmable gate array chip may be a field programmable gate array (FPGA) or a complex programming logic device (CPLD).

It should be noted that, in practical applications, the specific types of the first device and the second device may be determined according to service requirements. For example, the first device is an in-vehicle terminal device, and the in-vehicle terminal device may include a sensing device and an execution device in the vehicle. The second device is an in-vehicle computing power platform and/or a device related to vehicle travelling (for example, an execution device related to the vehicle travelling). In order to ensure the communication between the first device and the second device, the first device is an in-vehicle computing power platform and/or a device related to the vehicle travelling, and the second device is an in-vehicle terminal device.

For example, the first device may refer to various sensing devices and execution devices deposed in the vehicle, and the specific type of the first device is not specifically limited in the embodiments. The first device is connected to the field programmable gate array chip through the in-vehicle communication bus. The specific type of the in-vehicle communication bus is not specifically limited in the embodiments, and it can be selected from a CAN bus, a CAN-FD bus, a FlexRay bus, an LIN bus, an IO bus. Different buses may correspond to different protocols.

For example, the second device is the in-vehicle computing power platform which integrates various functional operations of the vehicle, and different functional operations correspond to different computing power units in the in-vehicle central computing power platform. The in-vehicle central computing power platform is connected to the field programmable gate array through the Ethernet. Therefore, the in-vehicle central computing power platform requires an Ethernet-related protocol. It should be noted that, in order to ensure that the data can be transmitted with low delay, the Ethernet is required to have a low delay function. For example, the Ethernet is an Ethernet network.

In a first aspect, the present disclosure provides in embodiments a data communication method. As shown in FIG. 1, the data communication method includes the following operations.

In block 101, a data subscription list is acquired, the data subscription list is configured to define a data transmission relationship between each first device and each second device in the vehicle.

In practical applications, the data subscription list is used to define the data transmission relationship(s) between the first device(s) and the second device(s) in the vehicle, that is, by checking the data subscription list, it can be determined whether a specific first device has a data transmission relationship with a specific second device or not. Further, a data transmission relationship is mutual, that is, when the first device has a data transmission relationship with a second device, it indicates that the second device has the data transmission relationship with the first device. In other word, the first and second devices are in the data transmission relationship or have the data transmission relationship with each other. A form of the data subscription list is not specifically limited in the embodiments, and it may be present in a form of a database table. The data subscription list is generated by a gateway where the field programmable gate array chip is located and the second device communicated to the Ethernet through a data distribution service (DDS) or SOME/IP communication protocol.

The data subscription list may be acquired from the following three sources.

First, the data subscription list for the vehicle may be determined by a vehicle manufacturer once the vehicle leaves the factory.

Second, the data subscription list may be set by a user of the vehicle, and the user can flexibly determine the data subscription list according to the user's needs for the vehicle.

Third, the data subscription list may be determined by an operating mode of the vehicle. Different operating modes may have different computing requirements. For example, after one operating mode is performed, a data subscription list for the operating mode is generated, and the second device(s) can acquire data supporting the operating mode, to allow the vehicle to be operated in the operating mode.

In block 102, an association between a transmission protocol of a first device and a transmission protocol of a second device having a data transmission relationship with the first device is established according to the data subscription list to generate a data distribution list. The data distribution list is configured to define a data transmission requirement between the first device and the second device having the data transmission relationship with the first device.

In practice applications, the data distribution list is generated by a processor, and a specific process includes at least the following two manners.

In a first manner, the processor is a target processor. The target processor is disposed in the vehicle, and the target processor is outside of and connected to the field programmable gate array chip. A type of the target processor is not specifically limited in the embodiments. Alternatively, the target processor may be an existing processor in the vehicle or a newly deployed processor. For example, the target processor may be an MCU or SOC in the vehicle. In this way, the functions of the field programmable gate array chip may be reduced, thereby reducing the cost of the field programmable gate array chip.

When a data distribution list needs to be generated, the data subscription list is transmitted to the target processor, and the target processor is triggered to utilize the data subscription list to establish the association between the transmission protocols involved in the first device and the second device that have the data transmission relationship with each other, and thus the data distribution list is generated. The field programmable gate array chip acquires the data distribution list generated by the target processor to perform high-speed, low-latency data transmission according to the data distribution list. In this generation method, the function of generating the data distribution list is realized by the processor, not the field programmable gate array chip, and the field programmable gate array chip only needs to use the data distribution list. In this way, the functions of the field programmable gate array chip may be reduced, thereby reducing the cost of the field programmable gate array chip.

In a second manner, the processor is a built-in processor. The built-in processor is integrated in the field programmable gate array chip, and the built-in processor is configured to generate the data distribution list. The built-in processor may be an ARM/M/R core.

When a data distribution list needs to be generated, the data subscription list is transmitted to the built-in processor, and the built-in processor is triggered to utilize the data subscription list to establish the association between the transmission protocols involved in the first device and the second device that have the data transmission relationship with each other, and thus the data distribution list is generated. In this way, the cost of the field programmable gate array chip may be increased, but since establishing the association between the transmission protocols of the first device and the second device having the data transmission relationship with each other and generating the data distribution list are realized in the field programmable gate array chip, the field programmable gate array chip does not need to interact with other devices during the generation of the data distribution list, thus improving the efficiency of establishing the association between the transmission protocols of the first device and the second device having the data transmission relationship with each other.

The data distribution list can be generated in any of the above two processes, the specific process of establishing, according to the data subscription list, the association between the transmission protocol of the first device and the transmission protocol of the second device having the data transmission relationship with the first device to generate the data distribution list is to perform the following operations 1 and 2 to the first device and the second device respectively.

In operation 1, a handshake is performed between the first device and the second device that have the data transmission relationship with each other through a preset communication protocol.

The preset communication protocol is a communication protocol that can be used between the first device and the second device that have the data transmission relationship with each other, and the specific type of the communication protocol is not specifically limited in the embodiments. For example, the communication protocol may be TCP/IP or UDP/IP.

A specific process of performing the handshake between the first device and the second device that have the data transmission relationship with each other by using the preset communication protocol will be described below.

Firstly, a first request message is received from the first device, and the first request message is sent to the second device. The first request message includes a first flag bit and a first random number generated by the first device. In order to prevent the first request message from being falsely stolen, the first request message needs to be encrypted during transmission.

Secondly, a response message, as feedback for the request message, is received from the second device, the response message is sent to the first device. The response message includes the first flag bit, an acknowledged sequence number generated by the second device according to the first random number, and a second flag bit and a second random number generated by the second device. The response message is generated after the second device successfully decrypts the first request message. To prevent the response message from being falsely stolen, the response message needs to be encrypted during transmission.

Thirdly, a second request message, as feedback for the response message, is received from the first device, the second request message is sent to the second device.

The second request message includes the second flag bit, and a second acknowledged sequence number generated by the first device according to the second random number. The second request message is generated after the first device successfully decrypts the response message and verifies the information carried in the response message. In order to prevent the second request message from being falsely stolen, the second request message needs to be encrypted during transmission.

Fourthly, a handshake success notification sent by the second device is received, and the first device is notified that the handshake is successful. The handshake success notification is generated after the second device successfully verifies the information carried in the second request message.

After the handshake between the first device and the second device that have the data transmission relationship with each other is completed successfully, it indicates that data can be securely transmitted between the first device and the second device. As long as the data transmission relationship between the first device and the second device remains unchanged, and the user does not terminate the data transmission relationship, once the successful handshake is realized, data transmission can be performed during subsequent data transmissions without additional handshakes.

In operation 2, after the handshake between the first device and the second device that have the data transmission relationship with each other is successful, a data transmission requirement sent by the second device is received, and the first device and the second device that have the data transmission relationship with each other and the data transmission requirement are correspondingly recorded in the data distribution list. The data transmission requirement is determined by an overall consideration of the protocols involved in the first device and the second device that have the data transmission relationship.

When the handshake between the first device and the second device having the data transmission relationship with each other is successful, in order to realize the data transmission from the first device to the second device, it is required to establish the association between the transmission protocol of the first device and the transmission protocol of the second device. The association is established by receiving the data transmission requirement sent by the second device when the handshake between the first device and the second device that have the data transmission relationship with each other is successful, and recording the first device and the second device that have the data transmission relationship with each other and the data transmission requirement in the corresponding manner into the data distribution list. The data transmission requirement is determined by the transmission protocol of the first device and the transmission protocol of the second device having the data transmission relationship with the first device, and is used to specifically define at least one of a data transmission format, a delay requirement for data transmission, a bandwidth requirement for data transmission, a data transmission source, and a data transmission destination. For example, the data transmission requirement is used to define the number of bytes of data, a byte format, and a type of a file in which the data resides.

After the data distribution list is established, the field programmable gate array chip will have the data distribution list. As long as there is no change in the data subscription list, the data distribution list will remain unchanged. Data transmission between the first device and the second device can be realized according to the data distribution list, and the second device can directly perform data processes on the received data.

The data distribution list may simultaneously record, i.e., include data distribution associations of a plurality of groups of the first device and the second device having the data transmission relationship with the first device, and thus a large amount of data can be distributed simultaneously, thereby reducing the time of data transmission between the first device and the second device, and improving data timeliness.

In block 103, when data transmitted from at least one first device is received, data of each of the at least one first device is transmitted to a second device having a data transmission relationship with the respective first device according to a corresponding data transmission requirement of the data distribution list.

When the first device needs to transmit data to the second device, the first device firstly transmits the data to the field programmable gate array chip, the field programmable gate array chip processes the data, and transmits the data to the second device.

When the data transmitted from one or more first devices is received, the data transmission requirement of the respective data is determined according to the data distribution list, and the respective data is converted according to the data transmission requirement. In this way, the data of the first device is transmitted according to the corresponding data transmission requirement to the second device having the data transmission relationship with the first device, and the second device performs operations on the data.

The data distribution list may simultaneously record, i.e., include data distribution associations of a plurality of groups of the first device and the second device having the data transmission relationship with the first device, and thus a large amount of data can be distributed simultaneously. In this way, multiple second devices can acquire data simultaneously, thus improving operation timeliness for the second device and ensuring the travelling safety for the vehicle.

Similarly, in order to realize mutual data transmission between the first device and the second device, when the second device needs to transmit data to the first device, the second device firstly transmits the data to the field programmable gate array chip, and the field programmable gate array chip processes the data and transmits the data to the first device. When data transmitted by one or more second devices is received, the data transmission requirement of the respective data is determined according to the data distribution list, and the respective data is converted according to the data transmission requirement. In this way, the data of the second device is transmitted according to the corresponding data transmission requirement to the first device having the data transmission relationship with the second device, and the first device performs operations on the data.

The data communication method provided by the embodiments of the present disclosure is applied to the field programmable gate array chip deployed in the vehicle. The field programmable gate array chip is connected to each first device in the vehicle through the in-vehicle communication bus, and is connected to each second device through the Ethernet. During data communication, the data subscription list for defining the data transmission relationship between each first device and each second device in the vehicle is acquired, and according to the data subscription list, the association between the transmission protocols of the first device and the second device that have the data transmission relationship with each other is established to generated the data distribution list for defining the data transmission requirement between the first device and the second device having the data transmission relationship with each other. When the data transmitted by the first device is received, the data of the first device is transmitted to the second device having the data transmission relationship with the first device according to the corresponding data transmission requirement of the data distribution list. In the embodiments of the present disclosure, the data communication is performed according to the data distribution list which is used to define the data transmission requirement between the first device and the second device that have the data transmission relationship with each other, and there is no need to re-establish the data link every time data is to be transmitted. Therefore, the real-time performance of the data communication between the first device and the second device is improved. In addition, by using the data distribution list to transmit data, a large amount of data can be distributed simultaneously, and thus multiple second devices can acquire corresponding data simultaneously.

Figure 2:
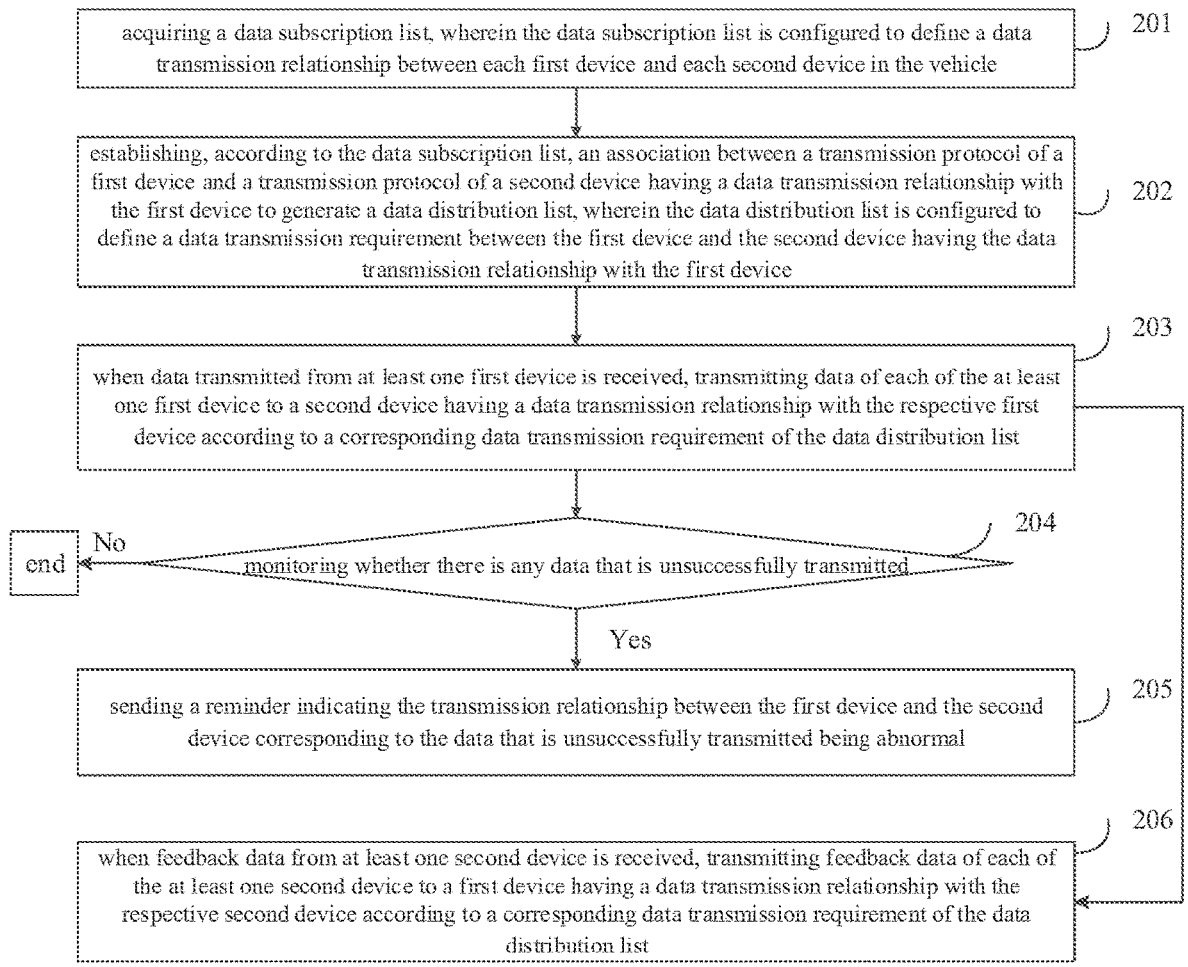
FIG. 2 is a flow chart of a data communication method according to another embodiment of the present disclosure.

In a second aspect, on the basis of the method in the first aspect, the present disclosure further provides in embodiments a data communication method. As shown in FIG. 2, the method includes the following operations.

In block 201, a data subscription list is acquired, the data subscription list is configured to define a data transmission relationship between each first device and each second device in the vehicle.

In block 202, an association between a transmission protocol of a first device and a transmission protocol of a second device having a data transmission relationship with the first device is established according to the data subscription list to generate a data distribution list. The data distribution list is configured to define a data transmission requirement between the first device and the second device having the data transmission relationship with the first device.

Further, after the data distribution list is generated, the data distribution list may be stored in the field programmable gate array chip. In order to ensure that the data distribution list is consistent with the user's transmission requirement in real time, it is detected in real time whether update information for the data subscription list is received.

If the update information for the data subscription list is received, it indicates that there is a change for the data transmission relationships between the first devices and the second devices. Based on the update information, the first device and the second device that have the data transmission relationship with each other are re-established to generate a new data distribution list, and the data transmission is performed according to the new data distribution list.

The process of re-establishing, according to the update information, the association between the transmission protocol of the first device and the transmission protocol of the second device having the data transmission relationship with the first device to generate the updated data distribution list includes the following two operations.

In a first operation, in the data subscription list, a first device and a second device that no longer have a data transmission relationship with each other, and a first device and a second device that have a newly added data transmission relationship with each other are determined according to the update information.

The update information may define which data transmission relationship between a first device and a second device is terminated, and which data transmission relationship between a first device and a second device needs to be established. Therefore, the first device and the second device that no longer have the data transmission relationship with each other, and the first and second devices that have the newly added data transmission relationship with each other are determined according to the update information.

In a second operation, the association between the transmission protocols of the first device and the second device that no longer have the data transmission relationship with each other is terminated, and an association between a transmission protocol of the first device and a transmission protocol of the second device having the newly added data transmission relationship is established, and thus the updated data distribution list is generated accordingly.

After determining the first device and the second device that no longer have the data transmission relationship with each other, and the first and second devices that have the newly added data transmission relationship with each other, the association between the transmission protocols of the first device and the second device that no longer have the data transmission relationship with each other is terminated. This termination actually means deleting the first device and the second device that no longer have the data transmission relationship with each other and their corresponding data transmission requirements from the original data distribution list. The association between the transmission protocols of the first device and the second device that have the newly added data transmission relationship with each other is established, and this establishing process is substantially the same as the establishing process described in the above block 102, expect for that the first device and the second device that have the newly added data transmission relationship, and their corresponding data transmission requirements are added to the original data distribution list.

After the above operations, a new data distribution list is formed, and each time data transmitted from the first device is received, the data transmission process needs to be performed according to the newly generated data distribution list.

In block 203, when data transmitted from at least one first device is received, data of each of the at least one first device is transmitted to a second device having a data transmission relationship with the respective first device according to a corresponding data transmission requirement of the data distribution list. An operation in block 204 or 206 is followed.

In block 204, it is monitored whether there is any data that is unsuccessfully transmitted. If yes, an operation in block 205 is performed; if no, the current process ends.

The data transmission from the first device to the second device will directly affect the travelling safety of the vehicle. Therefore, the data transmission needs to be monitored in order to discover the unsuccessfully transmitted data in time.

If it is monitored that there is data that is unsuccessfully transmitted, the travelling safety of the vehicle may be threatened, and thus an operation in block 205 needs to be performed to address the abnormal situation.

If it is monitored that no data is unsuccessfully transmitted, that is the data of each first device is transmitted to the corresponding second device, and the second device may perform operations on the data, which can ensure the travelling safety of the vehicle. The current process ends here.

In block 205, a reminder indicating the transmission relationship between the first device and the second device corresponding to the data that is unsuccessfully transmitted being abnormal is sent. The current process ends.

In practical applications, a reminding manner is not specifically limited in the embodiments. Alternatively, the reminder can be voice or text reminder to the user of the vehicle, or the reminder can be directly sent to the vehicle factory or the vehicle 4S management and control platform, to allow the abnormal transmission to be handled in time, thus ensuring the normal and safe driving of the vehicle.

In block 206, when feedback data from at least one second device is received, feedback data of each of the at least one second device is transmitted to a first device having a data transmission relationship with the respective second device according to a corresponding data transmission requirement of the data distribution list.

In some embodiments, after the data operation of the first device is completed, the second device will acquire feedback data from the first device, and the feedback data supports the in-vehicle terminal to perform a corresponding process. In this case, the feedback data needs to be sent back to the second device.

The data distribution list not only defines the data transmission requirement transmitted from the first device to the second device, but also defines the data transmission requirement transmitted from the second device to the first device. Therefore, when the feedback data is transmitted, the distribution list is also used.

Figure 3:
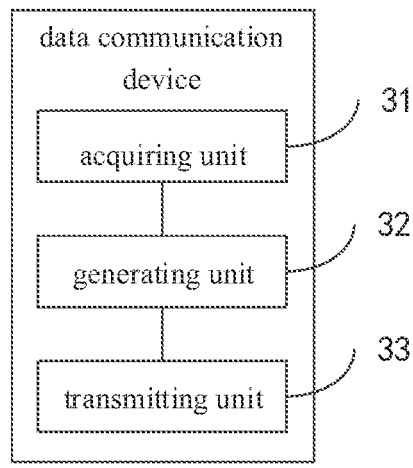
FIG. 3 is a block diagram of a data communication device according to an embodiment of the present disclosure.

In a third aspect, based on the methods shown in FIG. 1 and FIG. 2, the present disclosure provides in embodiment a data communication device, as shown in FIG. 3. The data communication device is applied to a field programmable gate array chip deployed in a vehicle. The field programmable gate array chip is connected to each first device in the vehicle through an in-vehicle communication bus, and is connected to each second device in the vehicle through an Ethernet. The device includes: an acquiring unit 31 configured to acquire a data subscription list, wherein the data subscription list is configured to define a data transmission relationship between each first device and each second device in the vehicle; a generating unit 32 configured to establish, according to the data subscription list, an association between a transmission protocol of a first device and a transmission protocol of a second device having a data transmission relationship with the first device to generate a data distribution list, wherein the data distribution list is configured to define a data transmission requirement between the first device and the second device having the data transmission relationship with the first device; and a transmitting unit 33 configured to transmit data of each of at least one first device to a second device having a data transmission relationship with the respective first device according to a corresponding data transmission requirement of the data distribution list when data transmitted from the respective first device is received.

The data communication device provided by the embodiments of the present disclosure is applied to the field programmable gate array chip deployed in the vehicle. The field programmable gate array chip is connected to each first device in the vehicle through the in-vehicle communication bus, and is connected to each second device through the Ethernet. During the data communication, the data subscription list for defining the data transmission relationship between each first device and each second device in the vehicle is acquired, and according to the data subscription list, the associations each between the transmission protocols of the first device and the second device that have the data transmission relationship with each other are established to generated the data distribution list for defining the data transmission requirement between the first device and the second device having the data transmission relationship with each other. When the data transmitted by the first device is received, the data of the first device is transmitted to the second device having the data transmission relationship with the first device according to the corresponding data transmission requirement of the data distribution list. In the embodiments of the present disclosure, the data communication is performed according to the data distribution list which is used to define the data transmission requirement between the first device and the second device that have the data transmission relationship with each other, and there is no need to re-establish the data link every time data is to be transmitted. Therefore, the real-time performance of the data communication between the first device and the second device is improved. In addition, by using the data distribution list to transmit data, a large amount of data can be distributed simultaneously, and thus multiple second devices can acquire corresponding data simultaneously.

Figure 4:
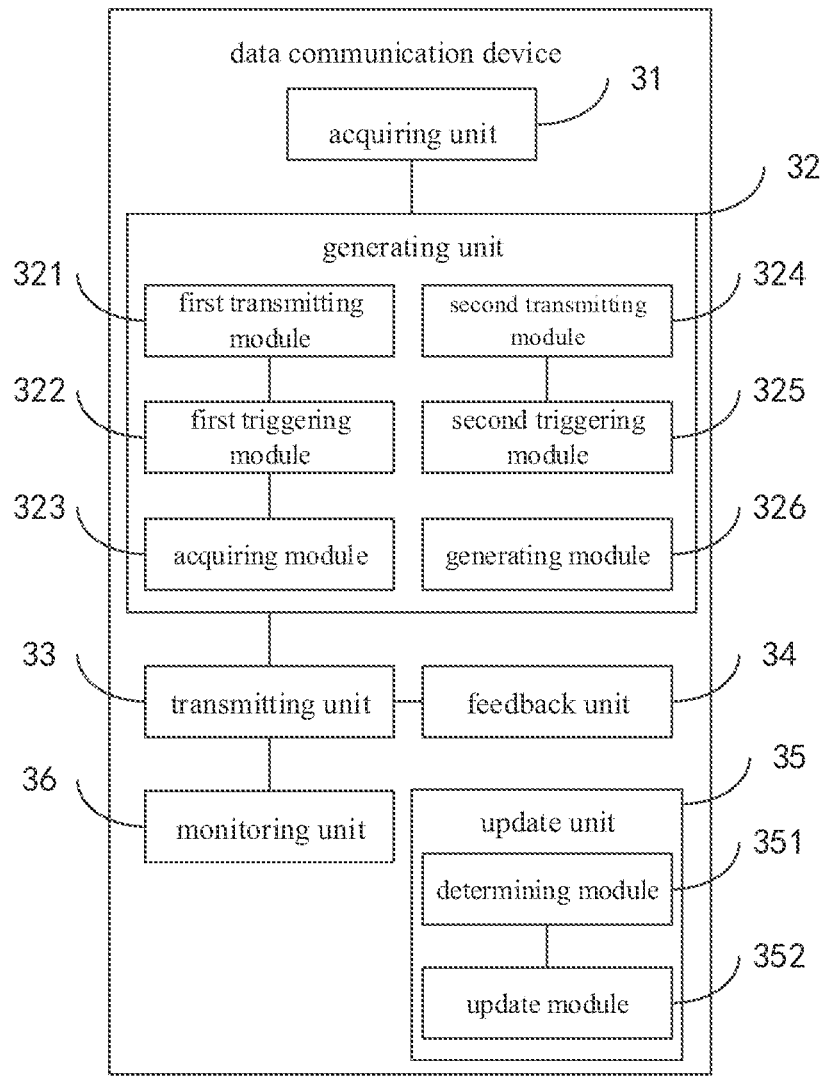
FIG. 4 is a block diagram of a data communication device according to another embodiment of the present disclosure.

In some embodiments, as shown in FIG. 4, the generating unit 32 includes: a first transmitting module 321 configured to transmit the data subscription list to a target processor, wherein the target processor is disposed in the vehicle, and located outside of and connected to the field programmable gate array chip; a first triggering module 322 configured to trigger the target processor to establish the association between the transmission protocol of the first device and the transmission protocol of the second device having the data transmission relationship with the first device to generate the data distribution list according to the data subscription list; and an acquiring module 323 configured to acquire the data distribution list generated by the target processor.

In some embodiments, as shown in FIG. 4, the generating unit 32 includes: a second transmitting module 324 configured to transmit the data subscription list to a built-in processor integrated in the field programmable gate array chip; and a second triggering module 325 configured to trigger the built-in processor to establish the association between the transmission protocol of the first device and the transmission protocol of the second device having the data transmission relationship with the first device to generate the data distribution list according to the data subscription list.

In some embodiments, as shown in FIG. 4, the generating unit 32 includes: a generating module 326 configured to perform the following operations to the first device and the second device that have the data transmission relationship with each other, respectively. The operations include: performing a handshake between the first device and the second device that have the data transmission relationship with each other through a preset communication protocol; when the handshake between the first device and the second device that have the data transmission relationship with each other is successful, receiving a data transmission requirement sent from the second device, and recording the first device and the second device that have the data transmission relationship with each other, and the corresponding data transmission request in the data distribution list, wherein the data transmission requirement is determined by an overall consideration of the protocols involved in the first device and the second device that have the data transmission relationship.

In some embodiments, as shown in FIG. 4, the device further includes: a feedback unit 34 configured to transmit feedback data of each of the at least one second device to a first device having a data transmission relationship with the respective second device according to a corresponding data transmission requirement of the data distribution list when the feedback data from the at least one second device is received.

In some embodiments, as shown in FIG. 4, the device further includes: an update unit 35 configured to re-establish, according to update information, the association between the transmission protocol of the first device and the transmission protocol of the second device having the data transmission relationship with the first device to generate an updated data distribution list when the update information for the data subscription list is received.

In some embodiments, as shown in FIG. 4, the update unit 35 includes: a determining module 351 configured to determine, according to the update information, a first device and a second device that no longer have a data transmission relationship with each other, and a first and a second device that have a newly added data transmission relationship with each other in the data subscription list; and an update module 352 configured to terminate the association between the transmission protocols of the first device and the second device that no longer have the data transmission relationship with each other, and establish an association between a transmission protocol of the first device and a transmission protocol of the second device having the newly added data transmission relationship to generate the updated data distribution list.

In some embodiments, as shown in FIG. 4, the device further includes: a monitoring unit 36 configured to monitor whether there is any data that is unsuccessfully transmitted after the transmitting unit 33 transmits the data of each of the at least one first device to the computing unit (i.e., the second device) having the data transmission relationship with the respective first device according to the corresponding data transmission requirement of the data distribution list; if yes, send a reminder indicating the transmission relationship between the first device and the second device corresponding to the data that is unsuccessfully transmitted being abnormal.

In some embodiments, the first device is an in-vehicle terminal device, and the second device is an in-vehicle computing power platform and/or a device related to vehicle travelling, or the first device is an in-vehicle computing power platform and/or a device related to vehicle travelling, and the second device is an in-vehicle terminal device.

In some embodiments, the data transmission requirement includes at least one selected from a data transmission format, a delay requirement for data transmission, a bandwidth requirement for data transmission, a data transmission source, and a data transmission destination.

In some embodiments, the Ethernet has a low delay function.

The data communication device provided in the embodiments of the third aspect may be configured to perform the data communication methods provided in the first or second aspect. Regarding the device in the above-mentioned embodiments, the specific manners in which each module performs corresponding operation may refer to the details described in the method embodiments, and will not be elaborated here again.

In a fourth aspect, the present disclosure provides in embodiments a vehicle communication system, including a communicator configured to perform the data transmission method according to any one of the embodiments of the first aspect and the second aspect when it is operated. In an embodiment, the communicator may include: a processor; a memory having stored therein a computer program that, when executed by the processor, causes the processor to perform the data transmission method according to any one of the embodiments of the first aspect and the second aspect.

Figure 5:
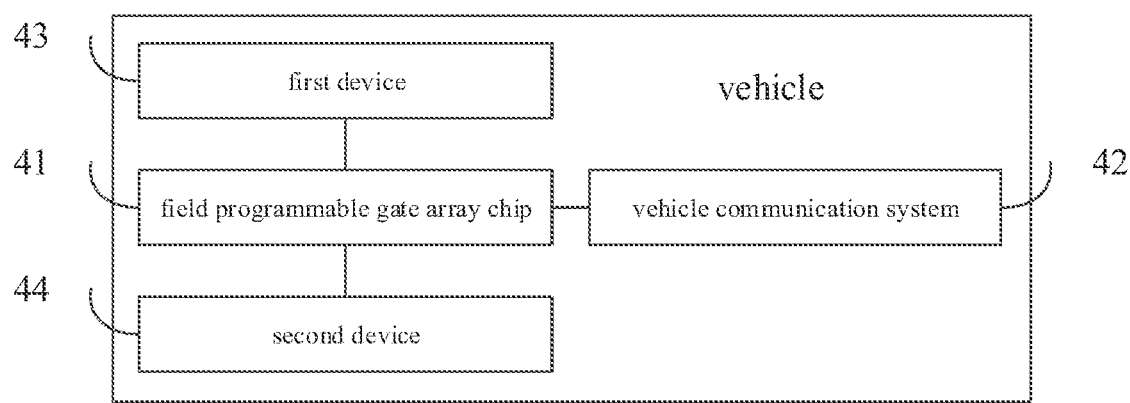
FIG. 5 is a block diagram of a vehicle according to an embodiment of the present disclosure.

In a fifth aspect, the present disclosure provides in embodiments a vehicle. As shown in FIG. 5, the vehicle includes a field programmable gate array chip 41, the vehicle communication system 42 as described in the fourth aspect, M first devices 43 and N second devices 44, where M and N are an integer greater than or equal to 1. Each first device 43 is configured to transmit data to the field programmable gate array chip 41. The field programmable gate array chip 41 is configured to transmit the data of the first device 43 to a second device 44 having a data transmission relationship with the first device 43 under control of the vehicle communication system 42. Each second device 44 is configured to receive data transmitted by the field programmable gate array chip 41.

In the vehicle provided by the embodiments of the present disclosure, during the data communication, the data subscription list for defining the data transmission relationship between each in-vehicle terminal and each computing unit of the in-vehicle computing platform in the vehicle is acquired by the field programmable gate array chip, and according to the data subscription list, the associations each between the transmission protocols of the in-vehicle terminal and the computing unit that have the data transmission relationship with each other are established to generated the data distribution list for defining the data transmission requirement between the in-vehicle terminal and the computing unit having the data transmission relationship with each other. When the data transmitted by the in-vehicle terminal is received, the data of the in-vehicle terminal is transmitted to the computing unit having the data transmission relationship with the in-vehicle terminal according to the corresponding data transmission requirement of the data distribution list. In the embodiments of the present disclosure, the data communication is performed according to the data distribution list which is used to define the data transmission requirement between the in-vehicle terminal and the computing unit that have the data transmission relationship with each other, and there is no need to re-establish the data link every time data is to be transmitted. Therefore, the real-time performance of the data communication between the in-vehicle terminal and the computing unit is improved. In addition, by using the data distribution list to transmit data, a large amount of data can be distributed simultaneously, and thus multiple computing units of the in-vehicle computing platform can acquire corresponding data simultaneously.

In the above embodiments, different embodiments may be described in details in different aspects. For one embodiment, the content which is not described in details may refer to the details described in the other embodiments.

It should be appreciated that, a method, a system, a device or a computer program product may be provided in the embodiments of the present disclosure. Accordingly, the embodiments of the present disclosure may be in a form of a hardware, a software, or a combination of software and hardware. Furthermore, an embodiment of the present disclosure may be provided in a form of a computer program product, and the computer program product includes one or more computer-readable storage medium (includes, but not limited to, a disk memory, a CD-ROM and an optical memory) stored therein computer-executable program codes that can be executed by the computer.

The present disclosure is described with reference to the flow charts and/or the block diagrams of methods, devices, systems, and computer program products of the embodiments of the present disclosure. It will be understood that each flow and/or block in the flow charts and/or the block diagrams, and combinations of flows and/or blocks in the flow charts and/or block diagrams, can be implemented by the computer program instructions. These computer program instructions may be provided to a processor of a general-purpose computer or a special-purpose computer, an embedded processor or a processor of other programmable data processing devices, to produce such a device that the instructions are executed by the processor of the computer or other programmable data processing devices to realize the functions specified in one or more processes of the flow chart and/or one or more blocks of the block diagram.

These computer program instructions may be stored in a computer-readable memory capable of directing the computer or other programmable data processing devices to function in a specific manner, such that the instructions stored in the computer-readable memory result in a manufactured material including instruction means, the instruction means may implement the function specified in one or more processes of the flow chart and/or one or more blocks of the block diagram.

These computer program instructions may be loaded on a computer or other programmable data processing device to cause a series of operational steps to be performed on the computer or other programmable device to produce a computer-implemented process. In this way, the instructions implemented on the computer or other programmable data processing device provide steps for realizing the function specified in one or more processes of the flow chart and/or one or more blocks of the block diagram.

In a typical configuration, a computer includes one or more processors (such as CPUs), an input/output interface, a network interface, and a memory.

In the computer readable media, the memory may be in a form of a volatile memory, a random-access memory (RAM) and/or a non-volatile memory. For example, the memory is a read only memory (ROM) or a flash RAM. That is, the memory is an example of a computer-readable medium.

The computer-readable medium includes volatile and non-volatile, removable and non-removable media, and may be used to store information by any suitable method or technology. Information may be computer-readable instructions, data structures, program modules, or other data. Examples of computer storage media include, but are not limited to, a parameter random access memory (PRAM), a static random access memory (SRAM), a dynamic random access memory (DRAM) or any other random access memory (RAM); a read only memory (ROM), an electrically erasable programmable read only memory (EEPROM), a flash memory or any other memory; a compact disc read only memory (CD-ROM), a digital versatile disc (DVD) or any other optical memory; a cassette, a magnetic disk, any other magnetic storage device or any other non-transmission medium, that can be used to store information that can be accessed by a computing device. As defined herein, computer-readable medium does not include transitory computer-readable medium, such as modulated data signals and carrier waves.

It should also be noted that the terms "include", "including" or any other variations thereof refer to a non-exclusive inclusion such that a process, a method, a product or a device including/including one or more elements includes not only the one or more elements, but also other elements not expressly listed or inherently owned by such a process, method, product or device. Unless specified or limited otherwise, a process, method, product or device defined to "include an element" does not exclude solutions of including more than one the same elements.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A data communication method, applied to a field programmable gate array chip deployed in a vehicle, the field programmable gate array chip being connected with each first device of the vehicle through an in-vehicle communication bus, and being connected with each second device in the vehicle through Ethernet, the method comprising:
    acquiring a data subscription list, wherein the data subscription list is configured to define a data transmission relationship between each first device and each second device in the vehicle;
    establishing, according to the data subscription list, an association between a transmission protocol of a first device and a transmission protocol of a second device having a data transmission relationship with the first device to generate a data distribution list, wherein the data distribution list is configured to define a data transmission requirement between the first device and the second device having the data transmission relationship with the first device; and
    when data transmitted from at least one first device is received, transmitting data of each of the at least one first device to a second device having a data transmission relationship with the respective first device according to a corresponding data transmission requirement of the data distribution list;
    wherein establishing the association between the transmission protocol of the first device and the transmission protocol of the second device having the data transmission relationship with the first device to generate the data distribution list comprises:
    performing the following operations for each of the first device and the second device having the data transmission relationship with the first device:
    performing a handshake between the first device and the second device having the data transmission relationship with the first device through a preset communication protocol;
    when the handshake between the first device and the second device having the data transmission relationship with the first device is completed, receiving a data transmission requirement sent by the second device, and recording the first device, the second device having the data transmission relationship with the first device, and the data transmission requirement into the data distribution list, wherein the data transmission requirement is determined by the transmission protocol of the first device and the transmission protocol of the second device having the data transmission relationship with the first device.

2. The data communication method according to claim 1, wherein establishing, according to the data subscription list, the association between the transmission protocol of the first device and the transmission protocol of the second device having the data transmission relationship with the first device to generate the data distribution list comprises:
    transmitting the data subscription list to a target processor;
    triggering the target processor to utilize the data subscription list to establish the association between the transmission protocol of the first device and the transmission protocol of the second device having the data transmission relationship with the first device to generate the data distribution list; and
    acquiring the data distribution list generated by the target processor.

3. The data communication method according to claim 1, wherein establishing the association between the transmission protocol of the first device and the transmission protocol of the second device having the data transmission relationship with the first device to generate the data subscription list comprises:
    transmitting the data subscription list to a built-in processor; and
    triggering the built-in processor to utilize the data subscription list to establish the association between the transmission protocol of the first device and the transmission protocol of the second device having the data transmission relationship with the first device to generate the data distribution list.

4. The data communication method according to claim 1, further comprising:
    when feedback data from at least one second device is received, transmitting feedback data of each of the at least one second device to a first device having a data transmission relationship with the respective second device according to a corresponding data transmission requirement of the data distribution list.

5. The data communication method according to claim 1, further comprising:
    when update information for the data subscription list is received, re-establishing, according to the update information, the association between the transmission protocol of the first device and the transmission protocol of the second device having the data transmission relationship with the first device to generate an updated data distribution list.

6. The data communication method according to claim 5, wherein re-establishing, according to the update information, the association between the transmission protocol of the first device and the transmission protocol of the second device having the data transmission relationship with the first device to generate an updated data distribution list comprises:
    determining, according to the update information, a first device and a second device that no longer have a data transmission relationship with each other, and a first and a second device that have a newly added data transmission relationship with each other in the data subscription list; and
    terminating the association between the transmission protocols of the first device and the second device that no longer have the data transmission relationship with each other, and establishing an association between a transmission protocol of the first device and a transmission protocol of the second device having the newly added data transmission relationship to generate the updated data distribution list.

7. The data communication method according to claim 1, wherein after transmitting the data of each of the at least one first device to the second device having the data transmission relationship with the respective first device according to the corresponding data transmission requirement of the data distribution list, the method further comprises:
- monitoring whether there is any data that is unsuccessfully transmitted;
- if yes, sending a reminder indicating the transmission relationship between the first device and the second device corresponding to the data that is unsuccessfully transmitted being abnormal.

8. The data communication method according to claim 1, wherein the data transmission requirement comprises a data transmission format, a delay requirement for data transmission, a bandwidth requirement for data transmission, a data transmission source, and a data transmission destination.

9. The data communication method according to claim 1, wherein performing the handshake comprises:
- receiving a first request message from the first device, and sending the first request message to the second device, wherein the first request message includes a first flag bit and a first random number generated by the first device;
- receiving a response message as feedback for the first request message from the second device, and sending the response message to the first device, wherein the response message includes the first flag bit, an acknowledged sequence number generated by the second device according to the first random number, and a second flag bit and a second random number generated by the second device;
- receiving a second request message as feedback for the response message from the first device, and sending the second request message to the second device, wherein the second request message includes the second flag bit, and a second acknowledged sequence number generated by the first device according to the second random number; and
- receiving a handshake success notification sent by the second device, and notifying the first device that the handshake is successful, wherein the handshake success notification is generated after the second device successfully verifies the information carried in the second request message.

10. A vehicle communication system, comprising:
- a communicator configured to perform a data transmission method when it is operated,
- wherein the data transmission method is applied to a field programmable gate array chip deployed in a vehicle, the field programmable gate array chip is connected with each first device of the vehicle through an in-vehicle communication bus, and is connected with each second device in the vehicle through Ethernet,
- the data transmission method comprising:
- acquiring a data subscription list, wherein the data subscription list is configured to define a data transmission relationship between each first device and each second device in the vehicle;
- establishing, according to the data subscription list, an association between a transmission protocol of a first device and a transmission protocol of a second device having a data transmission relationship with the first device to generate a data distribution list, wherein the data distribution list is configured to define a data transmission requirement between the first device and the second device having the data transmission relationship with the first device; and
- when data transmitted from at least one first device is received, transmitting data of each of the at least one first device to a second device having a data transmission relationship with the respective first device according to a corresponding data transmission requirement of the data distribution list;
- wherein establishing the association between the transmission protocol of the first device and the transmission protocol of the second device having the data transmission relationship with the first device to generate the data distribution list comprises:
- performing the following operations for each of the first device and the second device having the data transmission relationship with the first device:
- performing a handshake between the first device and the second device having the data transmission relationship with the first device through a preset communication protocol;
- when the handshake between the first device and the second device having the data transmission relationship with the first device is completed, receiving a data transmission requirement sent by the second device, and recording the first device, the second device having the data transmission relationship with the first device, and the data transmission requirement in a corresponding manner into the data distribution list, wherein the data transmission requirement is determined by the transmission protocol of the first device and the transmission protocol of the second device having the data transmission relationship with the first device.

11. The data communication system according to claim 10, wherein establishing, according to the data subscription list, the association between the transmission protocol of the first device and the transmission protocol of the second device having the data transmission relationship with the first device to generate the data distribution list comprises:
- transmitting the data subscription list to a processor;
- triggering the processor to utilize the data subscription list to establish the association between the transmission protocol of the first device and the transmission protocol of the second device having the data transmission relationship with the first device to generate the data distribution list; and
- acquiring the data distribution list generated by the processor.

12. The data communication system according to claim 10, wherein the data transmission method further comprises:
- when feedback data from at least one second device is received, transmitting feedback data of each of the at least one second device to a first device having a data transmission relationship with the respective second device according to a corresponding data transmission requirement of the data distribution list.

13. The data communication system according to claim 10, wherein the data transmission method further comprises:
- when update information for the data subscription list is received, re-establishing, according to the update information, the association between the transmission protocol of the first device and the transmission protocol of the second device having the data transmission relationship with the first device to generate an updated data distribution list.

14. The data communication system according to claim 10, wherein after transmitting the data of each of the at least one first device to the second device having the data transmission relationship with the respective first device according to the corresponding data transmission requirement of the data distribution list, the data transmission method further comprises:

monitoring whether there is any data that is unsuccessfully transmitted;

if yes, sending a reminder indicating the transmission relationship between the first device and the second device corresponding to the data that is unsuccessfully transmitted being abnormal.

15. A vehicle, comprising:

a field programmable gate array chip, a vehicle communication system comprising a communicator configured to perform a data transmission method when it is operated, at least one first device and at least one second device, wherein the field programmable gate array chip is connected with each first device through an in-vehicle communication bus, and is connected with each second device through Ethernet, wherein each first device is configured to transmit data to the field programmable gate array chip;

the field programmable gate array chip is configured to transmit the data of the first device to a second device having a data transmission relationship with the first device under control of the vehicle communication system;

each second device is configured to receive data transmitted by the field programmable gate array chip; and the data transmission method comprises:

acquiring a data subscription list, wherein the data subscription list is configured to define a data transmission relationship between each first device and each second device in the vehicle;

establishing, according to the data subscription list, an association between a transmission protocol of a first device and a transmission protocol of a second device having a data transmission relationship with the first device to generate a data distribution list, wherein the data distribution list is configured to define a data transmission requirement between the first device and the second device having the data transmission relationship with the first device; and when data transmitted from at least one first device is received, transmitting data of each of the at least one first device to a second device having a data transmission relationship with the respective first device according to a corresponding data transmission requirement of the data distribution list;

wherein establishing the association between the transmission protocol of the first device and the transmission protocol of the second device having the data transmission relationship with the first device to generate the data distribution list comprises:

performing the following operations for each of the first device and the second device having the data transmission relationship with the first device:

performing a handshake between the first device and the second device having the data transmission relationship with the first device through a preset communication protocol;

when the handshake between the first device and the second device having the data transmission relationship with the first device is completed, receiving a data transmission requirement sent by the second device, and recording the first device, the second device having the data transmission relationship with the first device, and the data transmission requirement in a corresponding manner into the data distribution list, wherein the data transmission requirement is determined by the transmission protocol of the first device and the transmission protocol of the second device having the data transmission relationship with the first device.

16. The vehicle according to claim 15, wherein the Ethernet has a low delay function.

17. The vehicle according to claim 15, wherein the first device is an in-vehicle terminal device, and the second device is an in-vehicle computing platform and/or a device related to vehicle travelling; or wherein the first device is an in-vehicle computing platform and/or a device related to vehicle travelling, and the second device is an in-vehicle terminal device.

18. The vehicle according to claim 15, wherein the data subscription list is transmitted to a target processor disposed in the vehicle, and located outside of and connected to the field programmable gate array chip, or to a built-in processor integrated in the field programmable gate array chip.

* * * * *